US009530578B2

(12) United States Patent
Chen et al.

(10) Patent No.: US 9,530,578 B2
(45) Date of Patent: Dec. 27, 2016

(54) ELECTRICAL SWITCHING APPARATUS AND TRANSMISSION ASSEMBLY THEREFOR

(71) Applicant: EATON CORPORATION, Cleveland, OH (US)

(72) Inventors: Qing Qi Chen, Xiamen (CN); Li Hua Bao, Suzhou Industrial Park (CN)

(73) Assignee: EATON CORPORATION, Cleveland, OH (US)

( * ) Notice: Subject to any disclaimer, the term of this patent is extended or adjusted under 35 U.S.C. 154(b) by 178 days.

(21) Appl. No.: 14/518,059

(22) Filed: Oct. 20, 2014

(65) Prior Publication Data

US 2016/0111229 A1      Apr. 21, 2016

(51) Int. Cl.
*H01H 3/30*        (2006.01)
*F16H 33/00*       (2006.01)
*H01H 3/42*        (2006.01)
*H01H 33/40*       (2006.01)
*H01H 33/42*       (2006.01)
*H01H 3/46*        (2006.01)
*H01H 33/666*      (2006.01)

(52) U.S. Cl.
CPC ............ *H01H 3/3026* (2013.01); *F16H 33/00* (2013.01); *H01H 3/42* (2013.01); *H01H 33/40* (2013.01); *H01H 33/42* (2013.01); *H01H 3/30* (2013.01); *H01H 3/3005* (2013.01); *H01H 3/46* (2013.01); *H01H 2033/6667* (2013.01)

(58) Field of Classification Search
CPC .............. H01H 3/30; H01H 5/00; F16H 33/00
USPC ........................................ 200/400, 401, 424
See application file for complete search history.

(56) References Cited

U.S. PATENT DOCUMENTS

| 5,938,008 | A  | 8/1999  | Wehrli, III et al. |
| 6,486,758 | B1 | 11/2002 | Olszewski et al.   |
| 7,186,937 | B1 | 3/2007  | Ricciuti et al.    |
| 7,598,468 | B2 | 10/2009 | Chen et al.        |

(Continued)

FOREIGN PATENT DOCUMENTS

DE        198 48 195 A1      4/2000

OTHER PUBLICATIONS

European Patent Office "International Search Report and Written Opinion for PCT/US2015/048828", Dec. 3, 2015, 11 pages.

*Primary Examiner* — Edwin A. Leon
*Assistant Examiner* — Iman Malakooti
(74) *Attorney, Agent, or Firm* — Eckert Seamans; John Powers; Grant Coffield

(57) ABSTRACT

A transmission assembly is for an electrical switching apparatus. The electrical switching apparatus includes a housing, a mount, at least one charging mechanism, and a pair of separable contacts. The transmission assembly has a drive assembly and a transfer assembly. The drive assembly includes a rotary driving member, a stored energy mechanism, and a linear driving member partially extending into the stored energy mechanism and being coupled to the rotary driving member. The transfer assembly cooperates with the drive assembly and the separable contacts and includes a sliding transfer component. The transmission assembly moves between a LOADED OPEN position, an UNLOADED CLOSED position, a LOADED CLOSED position, and an UNLOADED OPEN position. When the transmission assembly moves from the LOADED OPEN position to the UNLOADED CLOSED position, the linear driving member drives the sliding transfer component in a generally linear direction, thereby closing the separable contacts.

17 Claims, 6 Drawing Sheets

(56) References Cited

U.S. PATENT DOCUMENTS 7,696,447 B2 4/2010 Chen et al.
2012/0125752 A1 5/2012 Yamamoto et al.

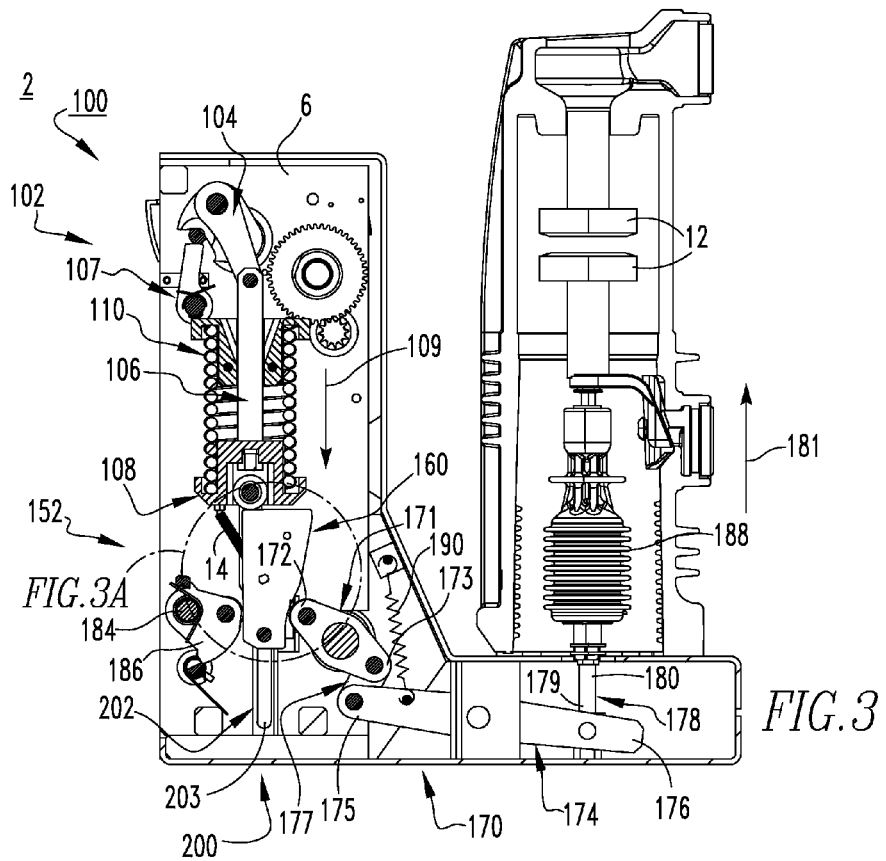
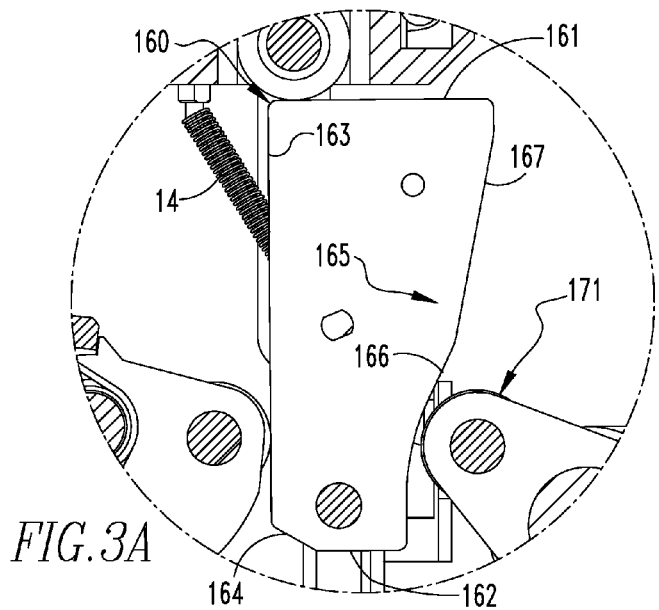

ELECTRICAL SWITCHING APPARATUS AND TRANSMISSION ASSEMBLY THEREFOR

BACKGROUND

Field

The disclosed concept pertains generally to electrical switching apparatus and, more particularly, to electrical switching apparatus such as for example, circuit breakers. The disclosed concept also pertains to transmission assemblies for electrical switching apparatus.

Background Information

Electrical switching apparatus, such as circuit breakers, provide protection for electrical systems from electrical fault conditions such as, for example, current overloads, short circuits, abnormal voltage and other fault conditions. Typically, circuit breakers include an operating mechanism which opens electrical contact assemblies to interrupt the flow of current through the conductors of an electrical system in response to such fault conditions as detected, for example, by a trip unit.

The operating mechanism of some medium voltage circuit breakers, for example, typically includes a cam assembly that allows the electrical contacts to open and close. The individual cams are expensive and difficult to manufacture. Additionally, the cam assembly requires significant labor time to assemble.

There is thus room for improvement in electrical switching apparatus and in transmission assemblies therefor.

SUMMARY

These needs and others are met by embodiments of the disclosed concept wherein a transmission assembly is provided which among other benefits, economically and efficiently allows a pair of separable contacts of an electrical switching apparatus to be opened and closed.

In accordance with one aspect of the disclosed concept, a transmission assembly for an electrical switching apparatus is provided. The electrical switching apparatus includes a housing, a mount coupled to the housing, at least one charging mechanism coupled to the mount, and a pair of separable contacts disposed within the housing. The transmission assembly comprises: a drive assembly comprising: a rotary driving member structured to be coupled to the charging mechanism, a stored energy mechanism, and a linear driving member partially extending into the stored energy mechanism and being coupled to the rotary driving member, a transfer assembly cooperating with the drive assembly and structured to cooperate with the separable contacts, the transfer assembly comprising a sliding transfer component structured to be disposed on the mount. The transmission assembly is structured to move between a LOADED OPEN position, an UNLOADED CLOSED position, a LOADED CLOSED position, and an UNLOADED OPEN position. When the transmission assembly moves from the LOADED OPEN position to the UNLOADED CLOSED position, the linear driving member drives the sliding transfer component in a generally linear direction, thereby closing the separable contacts.

As another aspect of the disclosed concept, an electrical switching apparatus is provided. The electrical switching apparatus comprises: a housing; a mount coupled to the housing; at least one charging mechanism coupled to the mount; a pair of separable contacts disposed within the housing, and a transmission assembly comprising: a drive assembly comprising: a rotary driving member coupled to the charging mechanism, a stored energy mechanism, and a linear driving member partially extending into the stored energy mechanism and being coupled to the rotary driving member, a transfer assembly cooperating with each of the drive assembly and the separable contacts, the transfer assembly comprising a sliding transfer component disposed on the mount. The transmission assembly is structured to move between a LOADED OPEN position, an UNLOADED CLOSED position, a LOADED CLOSED position, and an UNLOADED OPEN position. When the transmission assembly moves from the LOADED OPEN position to the UNLOADED CLOSED position, the linear driving member drives the sliding transfer component in a generally linear direction, thereby closing the separable contacts.

BRIEF DESCRIPTION OF THE DRAWINGS

A full understanding of the disclosed concept can be gained from the following description of the preferred embodiments when read in conjunction with the accompanying drawings in which:

FIG. 3 is a side elevation view of the electrical switching apparatus and transmission assembly therefor, showing the transmission assembly in the LOADED OPEN position;

FIG. 3A is an enlarged view of a portion of the electrical switching apparatus and transmission assembly therefor of FIG. 3;

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts.

As employed herein, the statement that two or more parts or components "engage" one another shall mean that the parts touch and/or exert a force against one another either directly or through one or more intermediate parts or components.

Figure 1:
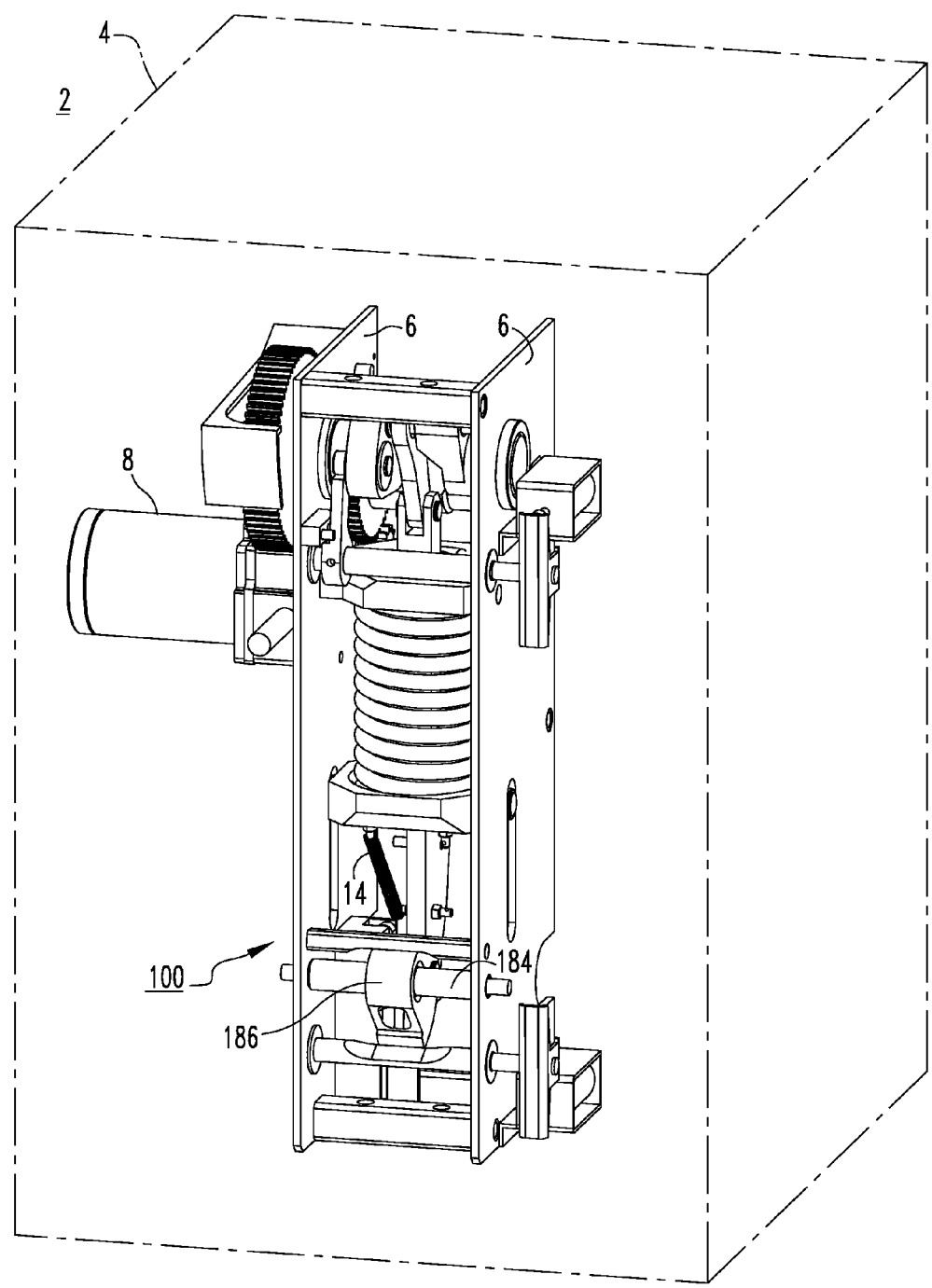
FIG. 1 is a simplified view of an electrical switching apparatus, and a portion of a transmission assembly therefor, in accordance with an embodiment of the disclosed concept.
Figure 2:
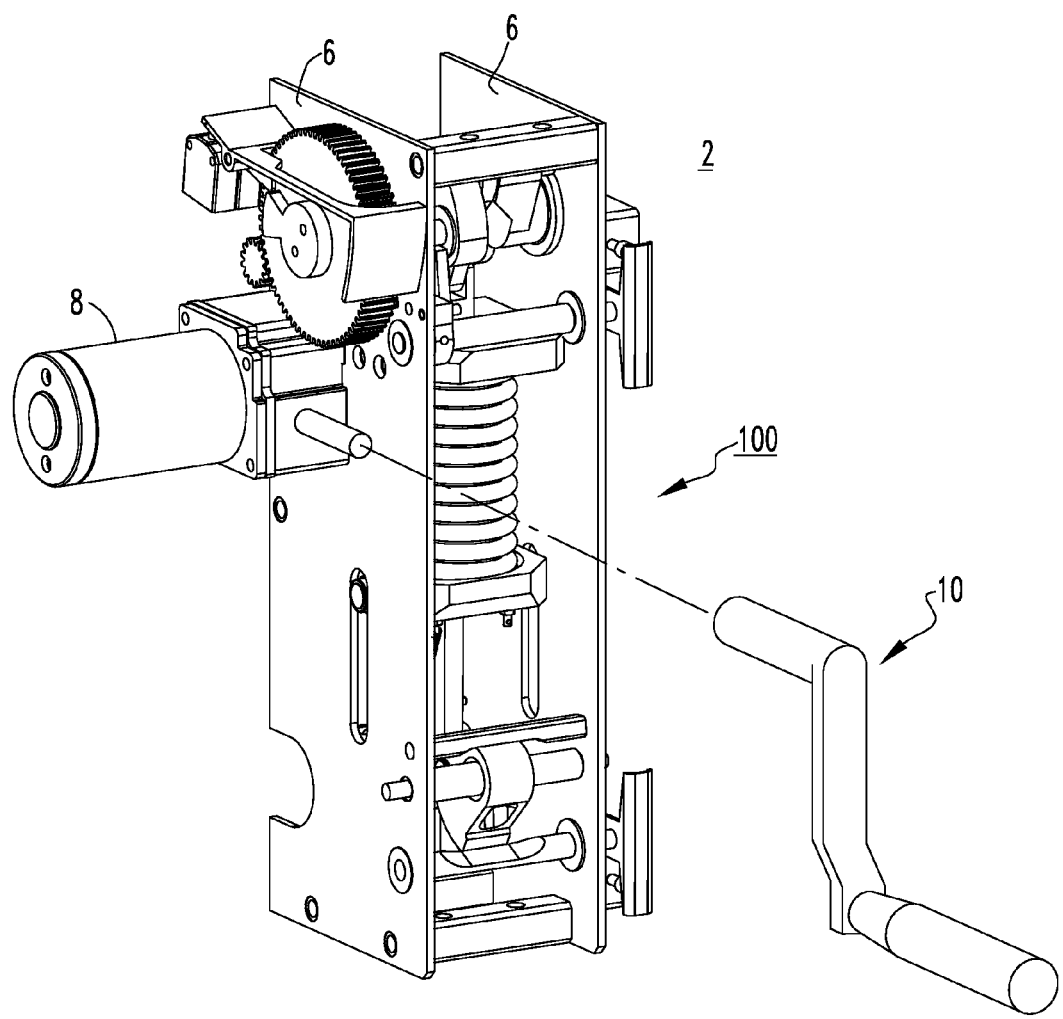
FIG. 2 is a front isometric view of a portion of the electrical switching apparatus and transmission assembly therefor of FIG. 1.

FIG. 1 shows an electrical switching apparatus (e.g., without limitation, medium voltage vacuum circuit breaker 2) in accordance with a non-limiting embodiment of the disclosed concept. In the example of FIG. 1, the circuit breaker 2 includes a housing 4 (shown in simplified form in phantom line drawing), a mount 6 coupled to the housing 4, a charging mechanism (e.g., without limitation, motor 8) coupled to the mount 6, and a transmission assembly 100. The circuit breaker 2 may also include a manual charging mechanism 10 in addition to the motor 8, as shown in FIG. 2. As will be discussed hereinbelow, the circuit breaker 2 further includes a pair of separable contacts 12 (FIGS. 3, 4, 5 and 6). Among other benefits, the disclosed transmission assembly 100 efficiently and economically allows the separable contacts 12 to be opened and closed.

Referring to FIG. 3, the transmission assembly 100 includes a drive assembly 102 and a transfer assembly 152. The drive assembly 102 cooperates with the charging mechanisms 8,10 (FIG. 2) and the transfer assembly 152. The transfer assembly 152 cooperates with the drive assembly 102 and the separable contacts 12. The drive assembly 102 has a rotary driving member 104 and a number of linear driving members 106,108 (two are shown) coupled to the rotary driving member 104. It will be appreciated that the rotary driving member 104 is further coupled to the motor 8 and the manual charging mechanism 10. The drive assembly 102 also includes a control member 107 that is coupled to the mount 6 and cooperates with the linear driving member 108. Additionally, the drive assembly 102 has a stored energy mechanism (e.g., without limitation, compression spring 110). Each of the linear driving members 106,108 at least partially extends into the spring 110, as shown.

The transfer assembly 152 includes a sliding transfer component 160 and a linkage assembly 170. The sliding transfer component 160 cooperates with each of the drive assembly 102 and the linkage assembly 170. Furthermore, the linkage assembly 170 cooperates with the separable contacts 12. As seen, the linkage assembly 170 has a number of rotary link members 171,174 (two are shown) and a number of coupling link members 177,178 (two are shown). The rotary link members 171,174 and the coupling link member 178 have respective end portions 172,173,175,176, and 179,180. The end portion 172 of the rotary link member 171 is structured to engage the sliding transfer component 160, and the coupling link member 177 couples the end portion 173 of the rotary link member 171 to the end portion 175 of the rotary link member 174. Additionally, the end portion 179 of the coupling link member 178 is coupled to the end portion 176 of the rotary link member 174, and the end portion 180 of the coupling link member 178 is coupled to the separable contacts 12.

As seen in the enlarged view of FIG. 3A, the sliding transfer component 160 has a number of base edges 161,162 and a number of sliding edges 163,165, which are located between the base edges 161,162. The base edge 161 is spaced from and parallel to the base edge 162. The sliding edge 163 is disposed opposite and spaced from the sliding edge 165. The sliding transfer component 160 further includes a connecting edge 164 connecting the sliding edge 163 to the base edge 162. In the example shown and described herein, the sliding edge 165 has a curved portion 166 and a linear portion 167.

Referring again to FIG. 3, the transfer assembly 152 includes a base assembly 200 coupled to the mount 6. The base assembly 200 has a base component 202 coupled to the mount 6. The base component 202 has an elongated linear slot 203. The sliding transfer component 160 is located in the elongated linear slot 203. It will be appreciated that FIGS. 3 and 3A show the transmission assembly 100 in a LOADED OPEN position corresponding to the linkage assembly 170 being in a RETRACTED position.

In operation, the control member 107 is configured to be actuated (e.g., without limitation, by a manual push button (not shown) located on the circuit breaker 2). Upon being actuated, the control member 107 releases the linear driving member 108 and the spring 110. When this happens, the rotary driving member 104 rotates and the linear driving members 106,108 move in a generally linear direction 109 in order to drive the sliding transfer component 160. As the sliding transfer component 160 begins to move, the sliding transfer component 160 slides within the slot 203 and the transmission assembly 100 moves from the LOADED OPEN position (FIG. 3) to an UNLOADED CLOSED position (FIG. 4), thereby closing the separable contacts 12.

Figure 4:
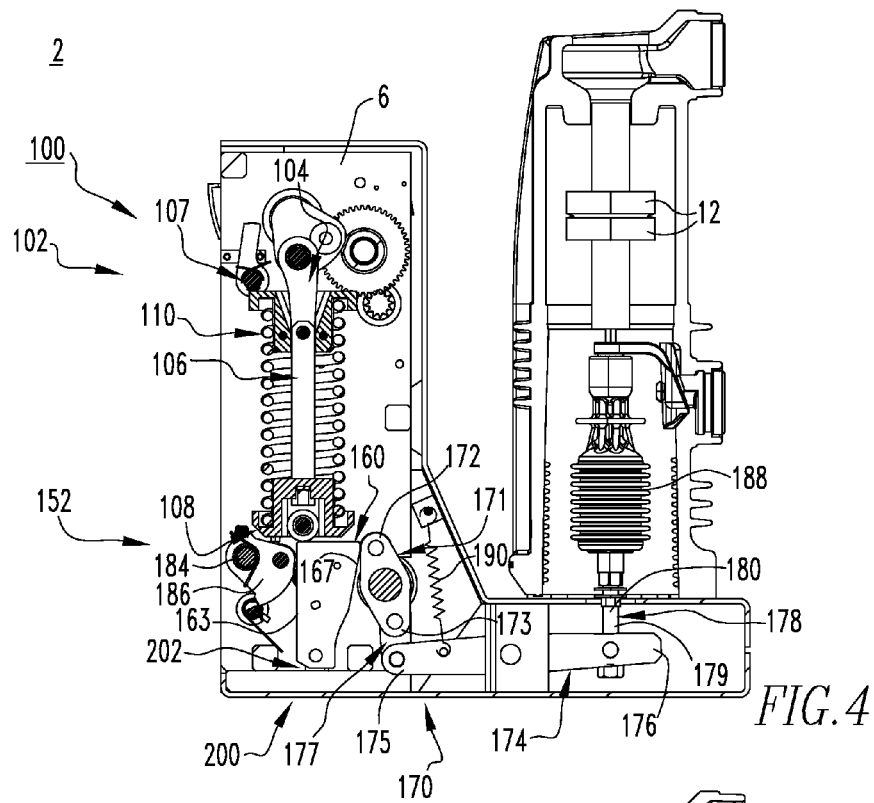
FIG. 4 is a side elevation view of the electrical switching apparatus and transmission assembly therefor, showing the transmission assembly in the UNLOADED CLOSED position.

Referring to FIGS. 3 and 4, it will be appreciated that when the transmission assembly 100 moves from the LOADED OPEN position (FIG. 3) to the UNLOADED CLOSED position (FIG. 4), the linkage assembly 170 moves from the RETRACTED position (FIG. 3) to an EXTENDED position (FIG. 4). Furthermore, when the transmission assembly 100 moves from the LOADED OPEN position (FIG. 3) to the UNLOADED CLOSED position (FIG. 4), the coupling link member 178 moves in a direction 181 generally opposite and parallel to the direction 109. Additionally, the end portion 172 of the rotary link member 171 slides from the curved portion 166 of the sliding transfer component 160 to the linear portion 167 of the sliding transfer component 160. In this manner, the transmission assembly 100 efficiently allows the spring 110 to cause the separable contacts 12 to be closed. Accordingly, among other benefits, the disclosed transmission assembly 100 eliminates cam assemblies required by the prior art and, therefore, is significantly less expensive and easier to manufacture than traditional transmission assemblies (not shown).

Figure 5:
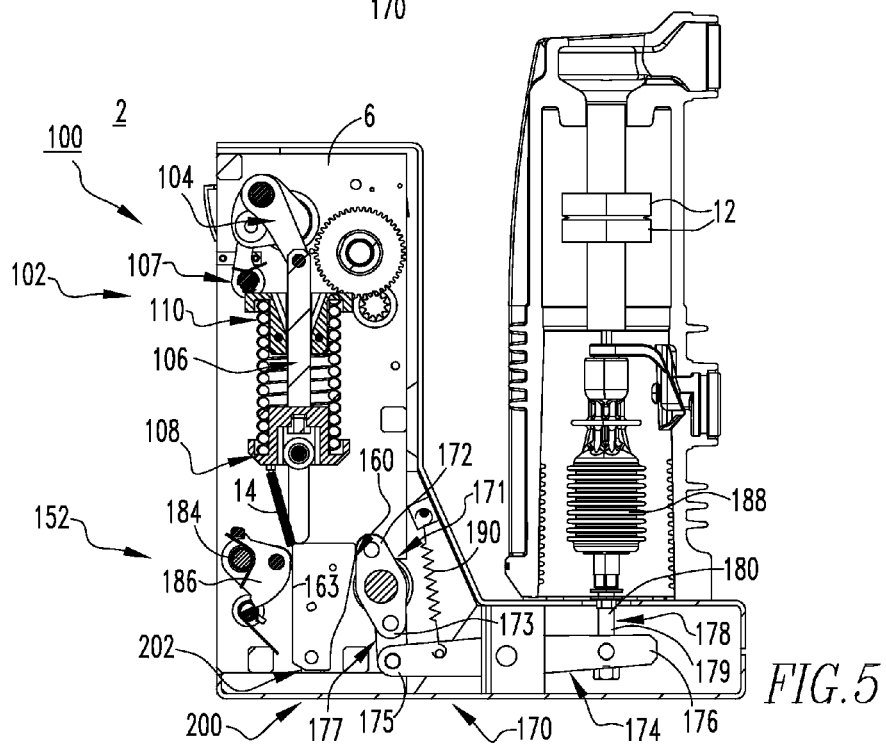
FIG. 5 is a side elevation view of the electrical switching apparatus and transmission assembly therefor, showing the transmission assembly in the LOADED CLOSED position.

Referring to FIGS. 4 and 5, the transmission assembly 100 also includes a LOADED CLOSED position (FIG. 5). When the transmission assembly 100 moves from the UNLOADED CLOSED position (FIG. 4) to the LOADED CLOSED position (FIG. 5), the linear driving member 108 moves away from the sliding transfer component 160. The LOADED CLOSED position (FIG. 5) is the position of the transmission assembly 100 when the circuit breaker 2 operational.

Continuing to refer to FIG. 5, the transfer assembly 152 further includes a rotary shaft component 184 and a hatchet component 186 coupled to the rotary shaft component 184. The rotary shaft component 184 is coupled to the mount 6 of the circuit breaker 2. The hatchet component 186 engages the sliding edge 163 of the sliding transfer component 160. Additionally, the transfer assembly 152 has a contact spring 188 and an opening spring 190 that are each coupled to the rotary link member 174. As seen, the contact spring 188 is further coupled to the separable contacts 12 and the opening spring 190 is coupled to the mount 6.

Figure 6:
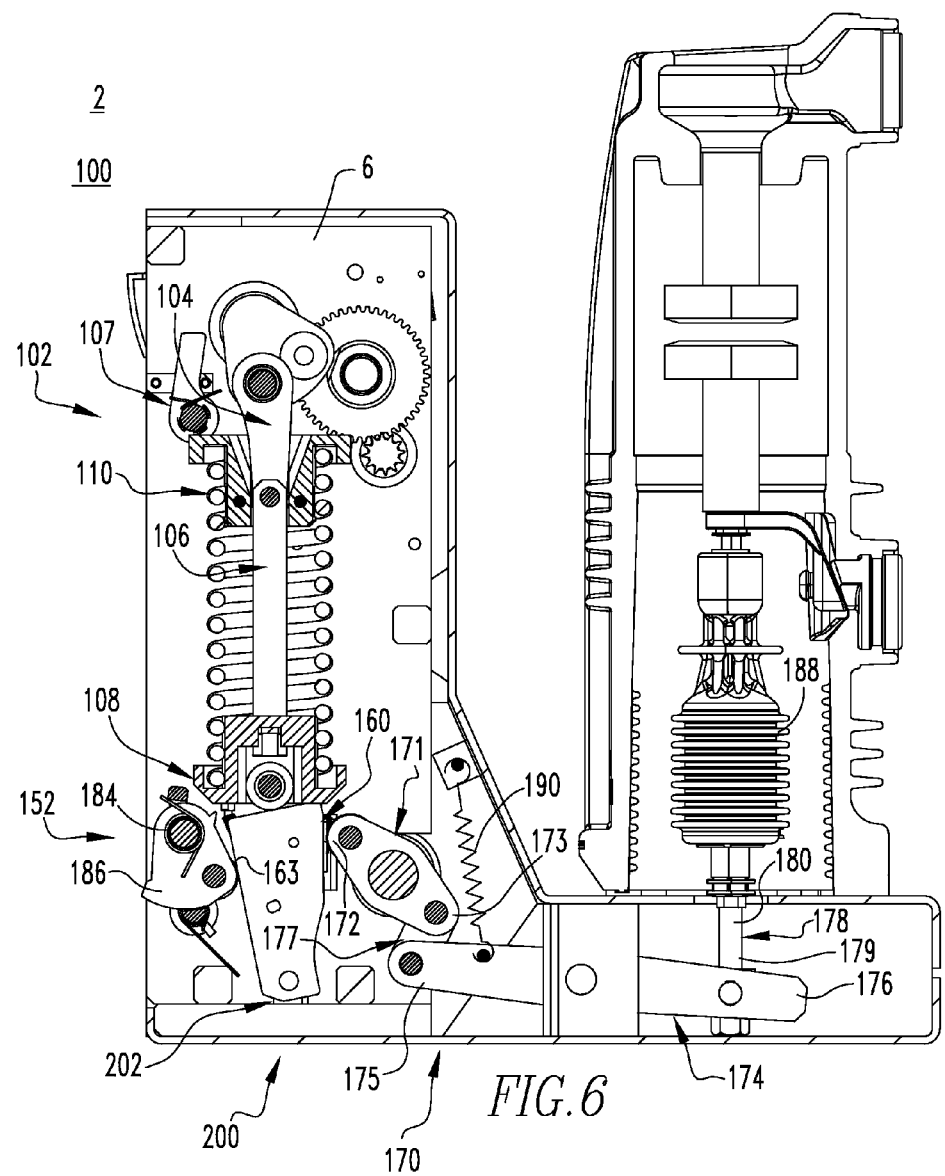
FIG. 6 is a side elevation view of the electrical switching apparatus and transmission assembly therefor, showing the transmission assembly in the UNLOADED OPEN position.

Referring to FIGS. 5 and 6, the transmission assembly 100 also includes an UNLOADED OPEN position (FIG. 6). When the transmission assembly 100 moves from the LOADED CLOSED position (FIG. 5) to the UNLOADED OPEN position (FIG. 6), the contact spring 188 and the opening spring 190 each release energy, thereby allowing the linkage assembly 172 to move from the EXTENDED position to the RETRACTED position. Furthermore, the sliding transfer component 160 is advantageously structured to tilt, such that the end portion 172 of the rotary link member 171 is able to slide on the linear portion 167 of the sliding edge 165, rather than being obstructed by a fixed sliding transfer component 160. When the transmission assembly 100 moves from the LOADED CLOSED position (FIG. 5) to the UNLOADED OPEN position (FIG. 6), the rotary shaft component 184 rotates and the hatchet component 186 slides on the sliding edge 163 of the sliding transfer component 160. In this manner, the transmission assembly 100 advantageously allows the separable contacts 12 to be opened.

Figure 7:
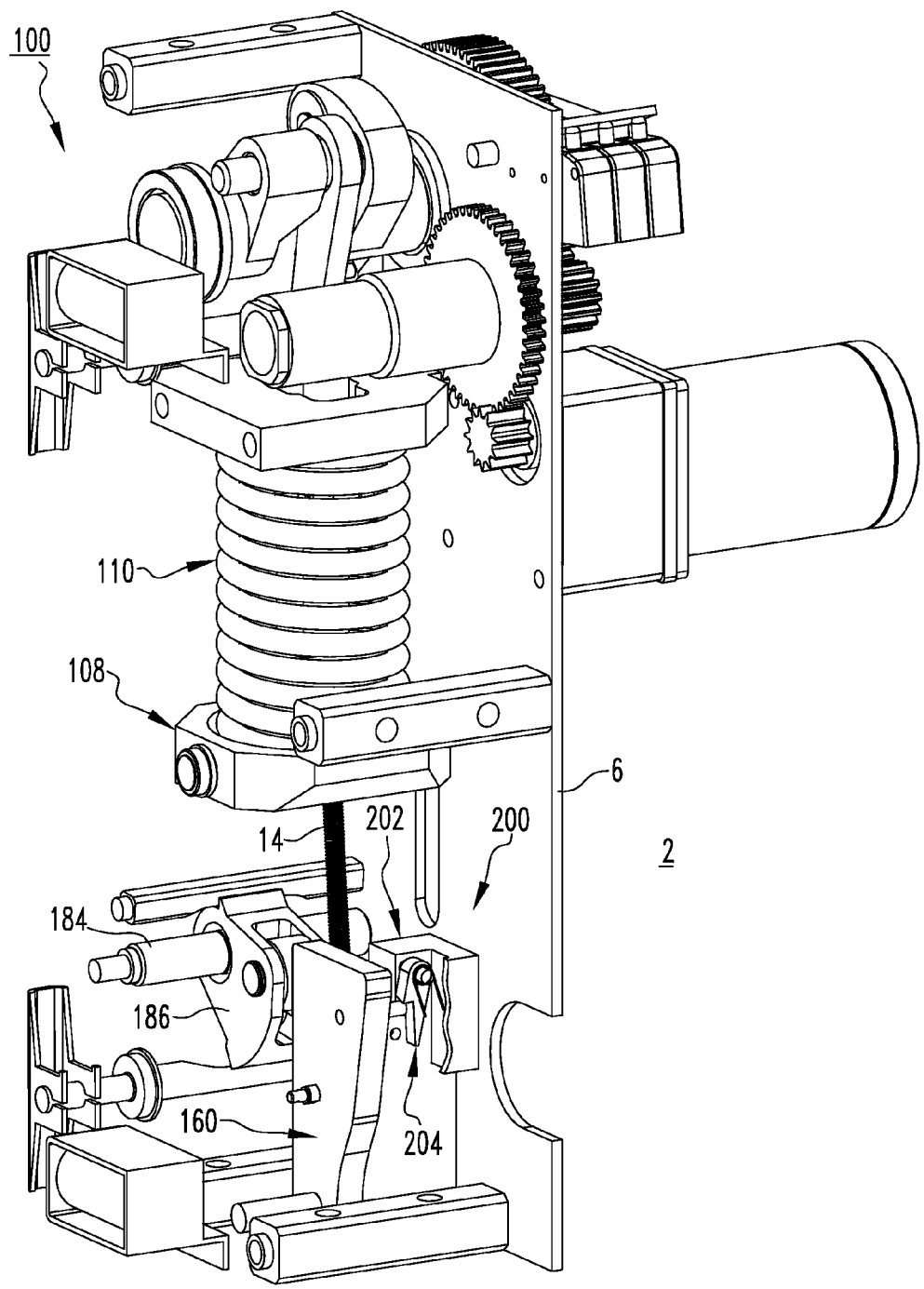
FIG. 7 is a front isometric view of a portion of the electrical switching apparatus of FIG. 1, shown with a portion of the mount removed to show hidden structures.

As seen in FIG. 7, the base assembly 200 further includes a locking component 204 coupled to the base component 202. When the transmission assembly 100 moves from the LOADED OPEN position (FIG. 3) to the UNLOADED CLOSED position (FIG. 4), the linear driving member 108 drives the sliding transfer component 160 to a DRIVEN position. When the transmission assembly 100 is in the UNLOADED CLOSED position (FIG. 4), the locking component 204 advantageously maintains the sliding transfer component 160 in the DRIVEN position. In this manner, the locking component 204 provides a suitable mechanism for the sliding transfer component 160 to keep the separable contacts 12 closed.

Continuing to refer to FIG. 7, the circuit breaker 2 further includes a reset spring 14 that is coupled to the linear driving member 108 and the and the sliding transfer component 160. When the transmission assembly 100 moves from the UNLOADED OPEN position (FIG. 6) to the LOADED OPEN position (FIG. 3), the reset spring 14 advantageously enables the sliding transfer component 160, the hatchet member 186, and the rotary shaft component 184 to move to the position shown in FIG. 3. In this manner, the circuit breaker 2 is reset and ready for the separable contacts 12 to be closed.

Accordingly, it will be appreciated that the disclosed concept provides for an improved (e.g., without limitation, less expensive, easier to manufacture) electrical switching apparatus (e.g., without limitation, medium voltage vacuum circuit breaker 2), and transmission assembly 100 therefor, which among other benefits, provides an improved mechanism to allow a pair of separable contacts 12 to be opened and closed.

Additionally, although the disclosed concept has been described in association with the sliding transfer component 160 having the base edges 161,162 and the sliding edges 163,165, it will be appreciated that a sliding transfer component (not shown) may have any suitable alternative shape and/or configuration in order to perform the desired function of allowing the linear driving member 108 to cooperate with the linkage assembly 170 to open and close the separable contacts 12 in a similar manner as described herein. Furthermore, it is within the scope of the disclosed concept for a linkage assembly (not shown) to have any suitable alternative number and/or configuration of link members (not shown) in order to perform the desired function of allowing the sliding transfer component 160 to cooperate with the separable contacts 12.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A transmission assembly for an electrical switching apparatus, said electrical switching apparatus comprising a housing, a mount coupled to said housing, at least one charging mechanism coupled to said mount, and a pair of separable contacts disposed within said housing, said transmission assembly comprising:
    a drive assembly comprising:
        a rotary driving member structured to be coupled to said at least one charging mechanism,
        a stored energy mechanism, and
        a linear driving member partially extending into said stored energy mechanism and being coupled to said rotary driving member,
    a transfer assembly cooperating with said drive assembly and structured to cooperate with said separable contacts, said transfer assembly comprising a sliding transfer component structured to be disposed on said mount;
    wherein said transmission assembly is structured to move between a LOADED OPEN position, an UNLOADED CLOSED position, a LOADED CLOSED position, and an UNLOADED OPEN position; wherein, when said transmission assembly moves from the LOADED OPEN position to the UNLOADED CLOSED position, said linear driving member drives said sliding transfer component in a generally linear direction, thereby closing said separable contacts; wherein said transfer assembly further comprises a base assembly comprising a base component; wherein said base component is structured to be coupled to said mount; wherein said base component has an elongated linear slot; wherein, when said transmission assembly moves from the LOADED OPEN position to the UNLOADED CLOSED position, said sliding transfer component slides within the slot; wherein said sliding transfer component has a DRIVEN position; wherein, when said transmission assembly moves from the LOADED OPEN position to the UNLOADED CLOSED position, said linear driving member drives said sliding transfer component to the DRIVEN position; wherein said base assembly further comprises a locking component coupled to said base component; and wherein, when said transmission assembly is in the UNLOADED CLOSED position, said locking component maintains said sliding transfer component in the DRIVEN position.

2. The transmission assembly of claim 1 wherein said transfer assembly further comprises a linkage assembly; wherein said linkage assembly cooperates with said sliding transfer component and is structured to cooperate with said separable contacts; and wherein, when said transmission assembly moves from the LOADED OPEN position to the UNLOADED CLOSED position, said linkage assembly moves from a RETRACTED position to an EXTENDED position, thereby closing said separable contacts.

3. The transmission assembly of claim 2 wherein said linkage assembly comprises a first coupling link member, a second coupling link member, a first rotary link member, and a second rotary link member; wherein each of said second coupling link member, said first rotary link member, and said second rotary link member has a first end portion and a second end portion; wherein the first end portion of said first rotary link member is structured to engage said sliding transfer component; wherein said first coupling link member couples the second end portion of said first rotary link member to the first end portion of said second rotary link member; wherein the second end portion of said second rotary link member is coupled to the first end portion of said second coupling link member; and wherein the second end portion of said second coupling link member is structured to be coupled to said separable contacts.

4. The transmission assembly of claim 3 wherein, when said transmission assembly moves from the LOADED OPEN position to the UNLOADED CLOSED position, said linear driving member moves in a first direction; and wherein, when said linkage assembly moves from the RETRACTED position to the EXTENDED position, said second coupling link member moves in a second direction generally parallel and opposite the first direction.

5. The transmission assembly of claim 1 wherein, when said transmission assembly moves from the UNLOADED CLOSED position to the LOADED CLOSED position, said linear driving member moves away from said sliding transfer component.

6. The transmission assembly of claim 5 wherein said transfer assembly further comprises an opening spring and a contact spring; wherein said opening spring is coupled to said second rotary link member and is structured to be coupled to said mount; wherein said contact spring is coupled to said second coupling link member and is structured to be coupled to said separable contacts; and wherein, when said transmission assembly moves from the LOADED CLOSED position to the UNLOADED OPEN position, each of said opening spring and said contact spring releases energy.

7. The transmission assembly of claim 5 wherein, when said transmission assembly moves from the LOADED CLOSED position to the UNLOADED OPEN position, said linkage assembly moves from the EXTENDED position to the RETRACTED position.

8. The transmission assembly of claim 1 wherein said drive assembly further comprises a control member cooperating with said linear driving member; wherein said control member is structured to be coupled to said mount; and wherein said control member is structured to release said linear driving member, thereby moving said transmission assembly from the LOADED OPEN position to the UNLOADED CLOSED position.

9. A transmission assembly for an electrical switching apparatus, said electrical switching apparatus comprising a housing, a mount coupled to said housing, at least one charging mechanism coupled to said mount, and a pair of separable contacts disposed within said housing, said transmission assembly comprising:
a drive assembly comprising:
a rotary driving member structured to be coupled to said at least one charging mechanism,
a stored energy mechanism, and
a linear driving member partially extending into said stored energy mechanism and being coupled to said rotary driving member,
a transfer assembly cooperating with said drive assembly and structured to cooperate with said separable contacts, said transfer assembly comprising a sliding transfer component structured to be disposed on said mount,
wherein said transmission assembly is structured to move between a LOADED OPEN position, an UNLOADED CLOSED position, a LOADED CLOSED position, and an UNLOADED OPEN position; wherein, when said transmission assembly moves from the LOADED OPEN position to the UNLOADED CLOSED position, said linear driving member drives said sliding transfer component in a generally linear direction, thereby closing said separable contacts; wherein said transfer assembly further comprises a linkage assembly; wherein said linkage assembly cooperates with said sliding transfer component and is structured to cooperate with said separable contacts; wherein, when said transmission assembly moves from the LOADED OPEN position to the UNLOADED CLOSED position, said linkage assembly moves from a RETRACTED position to an EXTENDED position, thereby closing said separable contacts; wherein said linkage assembly comprises a first coupling link member, a second coupling link member, a first rotary link member, and a second rotary link member; wherein each of said second coupling link member, said first rotary link member, and said second rotary link member has a first end portion and a second end portion; wherein the first end portion of said first rotary link member is structured to engage said sliding transfer component; wherein said first coupling link member couples the second end portion of said first rotary link member to the first end portion of said second rotary link member; wherein the second end portion of said second rotary link member is coupled to the first end portion of said second coupling link member; and wherein the second end portion of said second coupling link member is structured to be coupled to said separable contacts; wherein said sliding transfer component comprises a first base edge, a second base edge, a first sliding edge, and a second sliding edge; wherein the first base edge is parallel to and spaced from the second base edge; wherein the first sliding edge is opposite and spaced from the second sliding edge; wherein each of the first sliding edge and the second sliding edge is located between the first base edge and the second base edge; wherein the first sliding edge comprises a curved portion and a linear portion; and wherein, when said transmission assembly moves from the LOADED OPEN position to the UNLOADED CLOSED position, the first end portion of said first rotary link member slides on the first sliding edge from the curved portion to the linear portion.

10. The transmission assembly of claim 9 wherein said transfer assembly further comprises a rotary shaft component and a hatchet component coupled to said rotary shaft component; wherein said rotary shaft component is structured to be coupled to said mount; wherein said hatchet component engages the second sliding edge of said sliding transfer component; and wherein, when said transmission assembly moves from the LOADED CLOSED position to the UNLOADED OPEN position, said rotary shaft component rotates and said hatchet component slides on the second sliding edge of said sliding transfer component.

11. An electrical switching apparatus comprising:
a housing;
a mount coupled to said housing;
at least one charging mechanism coupled to said mount;
a pair of separable contacts disposed within said housing, and
a transmission assembly comprising:
a drive assembly comprising:
a rotary driving member coupled to said at least one charging mechanism,
a stored energy mechanism, and
a linear driving member partially extending into said stored energy mechanism and being coupled to said rotary driving member,
a transfer assembly cooperating with each of said drive assembly and said separable contacts, said transfer assembly comprising a sliding transfer component disposed on said mount, wherein said transmission assembly is structured to move between a LOADED OPEN position, an UNLOADED CLOSED position, a LOADED CLOSED position, and an UNLOADED OPEN position; wherein, when said transmission assembly moves from the LOADED OPEN position to the UNLOADED CLOSED position, said linear driving member drives said sliding transfer component in a generally linear direction, thereby closing said separable contacts; wherein said sliding transfer component has a DRIVEN position; wherein, when said transmission assembly moves from the LOADED OPEN position to the UNLOADED CLOSED position, said linear driving member drives said sliding transfer component to the DRIVEN position; wherein said transfer assembly further comprises a base assembly comprising a base component and a locking component coupled to said base component; wherein said base component is coupled to said mount; wherein said base component has an elongated linear slot; wherein, when said transmission assembly moves from the LOADED OPEN position to the UNLOADED CLOSED position, said sliding transfer component slides within the slot; and wherein, when said transmission assembly is in the UNLOADED CLOSED position, said locking component maintains said sliding transfer component in the DRIVEN position.

12. The electrical switching apparatus of claim 11 wherein said transfer assembly further comprises a linkage assembly; wherein said linkage assembly cooperates with each of said sliding transfer component and said separable contacts; and wherein, when said transmission assembly moves from the LOADED OPEN position to the UNLOADED CLOSED position, said linkage assembly moves from a RETRACTED position to an EXTENDED position, thereby closing said separable contacts.

13. The electrical switching apparatus of claim 12 wherein said linkage assembly comprises a first coupling link member, a second coupling link member, a first rotary link member, and a second rotary link member; wherein each of said second coupling link member, said first rotary link member, and said second rotary link member has a first end portion and a second end portion; wherein the first end portion of said first rotary link member is structured to engage said sliding transfer component; wherein said first coupling link member couples the second end portion of said first rotary link member to the first end portion of said second rotary link member; wherein the second end portion of said second rotary link member is coupled to the first end portion of said second coupling link member; and wherein the second end portion of said second coupling link member is coupled to said separable contacts.

14. The electrical switching apparatus of claim 13 wherein said sliding transfer component comprises a first base edge, a second base edge, a first sliding edge, and a second sliding edge; wherein the first base edge is parallel to and spaced from the second base edge; wherein the first sliding edge is opposite and spaced from the second sliding edge; wherein each of the first sliding edge and the second sliding edge is located between the first base edge and the second base edge; wherein the first sliding edge comprises a curved portion and a linear portion; and wherein, when said transmission assembly moves from the LOADED OPEN position to the UNLOADED CLOSED position, the first end portion of said first rotary link member slides on the first sliding edge from the curved portion to the linear portion.

15. The electrical switching apparatus of claim 14 wherein, when said transmission assembly moves from the UNLOADED CLOSED position to the LOADED CLOSED position, said linear driving member moves away from said sliding transfer component; wherein said transfer assembly further comprises an opening spring and a contact spring; wherein said opening spring is coupled to each of said second rotary link member and said mount; wherein said contact spring is coupled to each of said second coupling link member and said separable contacts; and wherein, when said transmission assembly moves from the LOADED CLOSED position to the UNLOADED OPEN position, each of said opening spring and said contact spring releases energy.

16. The electrical switching apparatus of claim 11 wherein said drive assembly further comprises a control member cooperating with said linear driving member; wherein said control member is coupled to said mount; and wherein said control member is structured to release said linear driving member, thereby moving said transmission assembly from the LOADED OPEN position to the UNLOADED CLOSED position.

17. The electrical switching apparatus of claim 11 wherein said electrical switching apparatus is a medium voltage vacuum circuit breaker; wherein said at least one charging mechanism is selected from the group consisting of a manual charging mechanism and a motor; wherein said drive assembly further comprises another linear driving member extending into said stored energy mechanism and coupling said linear driving member to said rotary driving member; and wherein said stored energy mechanism is a compression spring.

* * * * *